May 17, 1932.  T. ZERBI  1,858,911
DEVICE FOR COUPLING TWO AIRCRAFT ENGINES WITH PULLING OR TRACTIVE
SCREW PROPELLERS ROTATING IN OPPOSITE DIRECTIONS
Filed May 28, 1930
Fig. 1
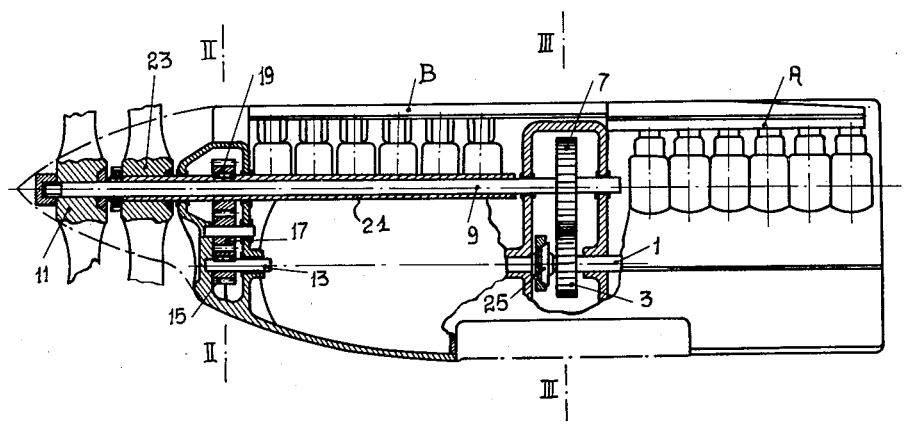
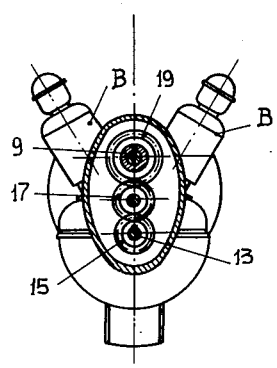
Fig. 2
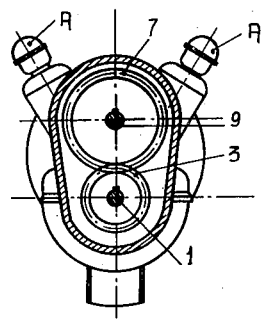
Fig. 3
Inventor,
Tranquillo Zerbi,
By Henry Orth Jr
atty.

Patented May 17, 1932

1,858,911

UNITED STATES PATENT OFFICE

TRANQUILLO ZERBI, OF TURIN, ITALY, ASSIGNOR TO FIAT SOCIETÁ ANONIMA, OF TURIN, ITALY

DEVICE FOR COUPLING TWO AIRCRAFT ENGINES WITH PULLING OR TRACTIVE SCREW PROPELLERS ROTATING IN OPPOSITE DIRECTIONS

Application filed May 28, 1930, Serial No. 456,468, and in Italy October 18, 1929.

This invention relates to a device for coupling two aircraft engines having pulling or tractive propellers arranged in tandem and rotating in opposite directions, more particularly for flying machines of the type in which a very compact engine unit with the smallest possible extension in the transverse direction is required in order to ensure an efficient air penetration.

It has been proposed in airplanes as well as in hydroplanes intended for exceedingly high speeds, to employ two big engines instead of one, thus reaching a strongly increased driving efficiency, the exposed transverse surface being equal; such attempts have not given a good result as it was necessary in this case to employ two propellers, viz. a pulling and a pushing or rear screw, situated at a considerable distance from each other which, in such machines of strongly reduced wing area increase the already considerable steering and driving difficulties.

According to this invention two engines are coupled together in such manner that the crankshafts transmit their power, preferably through a reducing gear, to two shafts, one of which is hollow while the other passes through the former, on which shafts two tractive or pulling propellers turning in opposite directions are keyed in tandem.

The rotation of the two propellers in opposite directions is obtained by the interposition of a reversing gear combined with the reducing gear of one of the two engines, or by rotating one of the engines in a direction opposite to the other.

According to this invention the engines to be coupled with the two pulling propellers mounted in proximity to each other may be arranged in tandem one on the extension of the other, or side by side with parallel engine shafts, and be supported by one frame or by separate frames, or they may be arranged in any other suitable manner.

A further object of this invention is to connect the two crankshafts together by means of a suitable coupling in order to keep the number of turns constant during flight.

The accompanying drawings show diagrammatically by way of example some constructural forms of the object of this invention.

Figure 1 is a side view partly in section of a unit comprising two engines connected in tandem.

Figure 2 shows a cross section on line II—II of Fig. 1.

Figure 3 is a cross section on line III—III of Fig. 1.

The cylinders of the two engines A and B coupled in tandem are arranged in a V-form and the reducing gears are both mounted on the front end of each engine.

On an extension of the crankshaft 1 of the engine A a toothed wheel 3 is mounted which drives the toothed wheel 7 keyed on a longitudinal shaft 9 arranged in the V-hollow of the two cylinder rows and provided at its free end with a hub 11 for one of the tractive or pulling screws.

On an extension of the crankshaft 13 of the engine B is similarly arranged a toothed wheel 15 which actuates through a reversing toothed wheel 17 the toothed wheel 19 rigidly keyed on the hollow shaft 21, within which extends the shaft 9 and which carries a hub 23 behind the hub 11 on which the second tractive screw is keyed.

According to my invention between the crankshaft 1 of the engine A and the crankshaft 13 of the engine B, I arrange a coupling 25 of suitable type.

When the coupling 25 includes hand operated or automatic clutch members (not shown on the drawings) these may be suitably placed in the engine casing and abut a suitable transmission.

It is understood that this invention may be used in connection with engines arranged other than in tandem, e. g. engines with parallel axes lying side by side or with superposed axes.

What I claim is:

1. In a propelling system for aircraft, the combination with a pair of propellers turning in opposite directions and co-axial shafts for said propellers, of a casing, a pair of V-engines mounted in longitudinal alignment on said casings, supports for said propeller shafts in said casing, crank-shafts mounted in alignment in said casing and means for coupling one of said crank-shafts with a propeller shaft and for coupling the other crank-shaft with the other propeller shaft.

2. In a propelling system for aircraft, the combination with a pair of propellers turning in opposite directions and co-axial shafts for said propellers, of a casing, a pair of V-engines mounted in longitudinal alignment on said casing, supports for said propeller shafts on said casing in the vertical longitudinal middle plane, crank-shafts for said engines, mounted in alignment in said casing, a reducing mechanism connecting one of said crank-shafts with a propeller shaft and a reducing-reversing gear connecting the other crank-shaft with the other propeller shaft.

3. In a propelling system for aircraft, the combination with a pair of propellers turning in opposite directions and co-axial shafts for said propellers, of a casing, a pair of V-engines mounted in longitudinal alignment on said casing, supports for said propeller shafts on said casing in the vertical longitudinal middle plane, crank-shafts for said engines, mounted in alignment in said casing, a clutch for connecting together said crank-shafts, a reducing gear connecting one of said crank-shafts with a propeller shaft and a reducing-reversing gear connecting the other crank-shaft with the other propeller shaft.

4. In a propelling system for aircraft, the combination with a pair of propellers turning in opposite directions and co-axial shafts for said propellers, of a casing, a pair of V-engines mounted in longitudinal alignment on said casing, supports for said propeller shafts on said casing in the vertical longitudinal middle plane, crank-shafts for said engines, mounted in alignment in said casing, a clutch for connecting together said crank-shafts, a reducing gear connecting one of said crank-shafts with a propeller shaft, a reducing-reversing gear connecting the other crank-shaft with the other propeller shaft, a box formed at the front end of the casing for receiving said reducing-reversing gear and the clutch.

In testimony that I claim the foregoing as my invention, I have signed my name.

TRANQUILLO ZERBI.